United States Patent [19]

Menche

[11] 4,174,382
[45] Nov. 13, 1979

[54] PROCESS FOR THE PRODUCTION OF COARSE $K_2SO_4$ IN CRYSTALLIZERS AND CLASSIFIERS

[75] Inventor: Eckhard Menche, Heringen, Fed. Rep. of Germany

[73] Assignee: Kali und Salz AG, Kassel, Fed. Rep. of Germany

[21] Appl. No.: 804,727

[22] Filed: Jun. 8, 1977

[30] Foreign Application Priority Data

Jun. 22, 1976 [DE] Fed. Rep. of Germany ....... 2627871

[51] Int. Cl.² .................. C01D 5/00; C01D 15/06; C01D 17/00
[52] U.S. Cl. .................................. 423/552; 23/302 T; 422/252
[58] Field of Search ................. 423/551, 552, 199; 23/296, 302 T, 300; 202/237; 203/47

[56] References Cited

U.S. PATENT DOCUMENTS

| 1,932,674 | 10/1933 | Pyzel ..................... | 423/549 |
|---|---|---|---|
| 2,025,756 | 12/1935 | Larsson ................... | 423/551 |
| 3,425,795 | 2/1969 | Howard ................... | 423/421 |
| 3,967,930 | 7/1976 | Sadan ..................... | 423/551 |

FOREIGN PATENT DOCUMENTS 627446 9/1961 Canada ........................ 23/300

OTHER PUBLICATIONS

Garrett, D. E. Applications, Industrial & Engineering Chemistry, vol. 53, #8, Aug. 1961, pp. 623–628.
Saeman, W. C., Design Industrial & Engineering Chemistry, vol. 53, #8, Aug. 1961, pp. 612–622.

Primary Examiner—O. R. Vertiz
Assistant Examiner—Gary P. Straub
Attorney, Agent, or Firm—Millen & White

[57] ABSTRACT

A process for selectively recovering coarse crystalline $K_2SO_4$ from a crystallizer is disclosed. A classifier comprising an elongated cylindrical vessel which is located separate from the crystallizer is employed in the process. Crystallization is effected in the crystallizer and supernatant liquor recovered as overflow during crystallization is passed from the crystallizer into the lower portion of the elongated cylindrical vessel. Slurry is recovered from the bottom of the crystallizer and introduced into a middle portion of the elongated cylindrical vessel. Coarse crystalline $K_2SO_4$ falls to the bottom of the elongated cylindrical vessel and is recovered therefrom. Fine crystalline $K_2SO_4$ is entrained in the upwardly flowing liquor and passed upwardly therewith. The upwardly flowing liquor and fine crystalline $K_2SO_4$ are withdrawn from the top of the elongated cylindrical vessel and recycled to the crystallizer.

8 Claims, 1 Drawing Figure

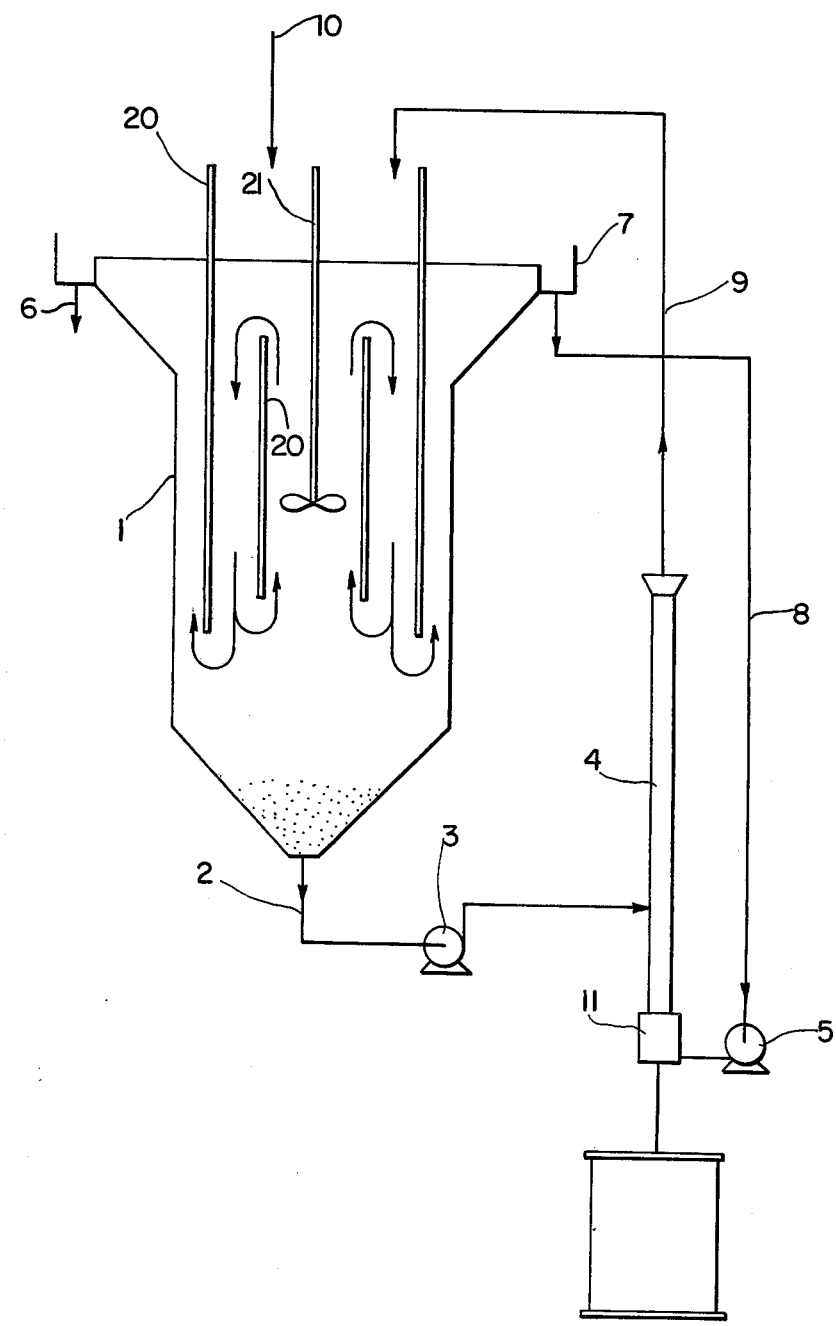

PROCESS FOR THE PRODUCTION OF COARSE $K_2SO_4$ IN CRYSTALLIZERS AND CLASSIFIERS

BACKGROUND OF THE INVENTION

In the prior art, salts are conventionally produced in crystallizers employing a directly installed classifier.

The production of coarse salts, requires a high slurry density of over 30%, in order to limit nuclei formation. Slurry density is determined by dividing the weight of salt by the weight of the salt and the weight of solution.

German Pat. No. 1,297,079 teaches obtention of coarse salts from solutions and more specifically the extraction of coarse KCl. In the process described in German Pat. No 1,297,079, a crystallizer with a directly connected classifier located above the crystallizer is utilized. Coarse KCl suitable for use in fertilizer is produced from concentrates containing 5 to 40% by weight of solid content.

For crystallization of coarse $K_2SO_4$, which is used as a fertilizer, preferably in chlorine-free form, a greater slurry density, over 40% by weight is required.

In the known crystallizers this high slurry density may be adjusted, but the continuous withdrawal of salt to a directly mounted classifier such as the classifier of German Pat. No. 1,297,079 detrimentally affects separation sharpness below in the crystallizer because of the formation of packs of (slurry) above the extension of the classifier pipe. The effective classifying section of the classifier is limited thereby to the uppermost part of the classifier pipe and the lower conical part of the crystallizer.

The prior art has the disadvantage that salts with a high content of fine grains below 0.2 mm are present in the classified salt after separation.

The foregoing disadvantages of the prior art are overcome by the process of this invention wherein coarse $K_2SO_4$ is obtained utilizing a crystallizer with interior circulation. This is accomplished by removing the salt from the crystallizer for classification and utilizing for classification, a classifier which is separate from the crystallizer.

The process of the invention permits the obtention of coarse $K_2SO_4$ with a high order of selectivity.

SUMMARY OF THE INVENTION

The invention provides a method for the production of $K_2SO_4$ with highly selective recovery of coarse $K_2SO_4$. Potassium sulfate or $K_2SO_4$ precursor and a solvent therefor are introduced into a crystallizer having a slurry outlet means at the bottom portion thereof, an overflow means at the top portion thereof and circulation means therein. A mother liquor comprising a supersaturated solution of $K_2SO_4$ is formed in said crystallizer. Potassium sulfate is crystallized out of said supersaturated solution of $K_2SO_4$ to form a slurry comprising coarse and fine crystalline $K_2SO_4$ and supernatant. The slurry has a slurry density of over 40% and up to about 80%. The slurry is withdrawn from the bottom portion of the crystallizer and introduced into a classifier comprising an elongated tubular vessel. Supernatant collecting at the overflow means is withdrawn and introduced into the lower portion of the elongated tubular vessel. In the elongated tubular vessel, a slurry density of from about 15% to about 25% is maintained. In supernatant and fine crystalline $K_2SO_4$ are passed upwardly in the elongated tubular vessel, withdrawn as overhead from the elongated tubular vessel and recycled to the crystallizer. The coarse crystalline $K_2SO_4$ at the lower portion of the elongated tubular vessel is withdrawn and recovered as product. A portion of the supernatant collected at the overflow means may also be withdrawn from the overflow means and recovered. The $K_2SO_4$ or $K_2SO_4$ precursor and solvent may be introduced into the crystallizer in the form of a solution.

In one embodiment of the invention, one or more salts selected from the group consisting of $MgSO_4 \cdot 7H_2O$, $K_2SO_4 \cdot MgSO_4 \cdot 4H_2O$ and $K_2SO_4 \cdot MgSO_4 \cdot 6H_2O$, water and KCl are introduced into the crystallizer to form a mother liquor containing $K_2SO_4$, the mother liquor formation is effected at about a constant temperature.

The elongated tubular vessel is preferably a cylindrical vessel having a length of from about 0.8 meters to about 2 meters. The elongated cylindrical vessel is also preferably of a size such that ratio of diameter to length of said vessel is from about 1:10 to 1:15.

In another embodiment of the invention, the crystallizer is operated at a slurry density of 45% $K_2SO_4$, and KCl, water and a sulfate salt selected from the group consisting of $MgSO_4 \cdot 7H_2O$, $K_2SO_4 \cdot MgSO_4 \cdot 4H_2O$ and $K_2SO_4 \cdot MgSO_4 \cdot 6H_2O$ are introduced into the crystallizer to form $K_2SO_4$ having an average grain diameter of about 0.35mm at a uniformity coefficient of 2.4.

Generally, classification is affected by adjusting the rate of flow of the fluid passing upwardly within the elongated cylinder to collect $K_2SO_4$ having a grain size above about 0.3 mm to about 0.5mm.

DESCRIPTION OF THE DRAWINGS

FIG. 1 is a schematic representation of the process.

Coarse $K_2SO_4$ is obtained utilizing interior circulation and removal of $K_2SO_4$ from the crystallizer for classification. The solution to be crystallized or the solid starting materials and solvent are continuously fed via line 10 into crystallizer 1 having baffles 20 and an agitator 21 to induce circulation therein. A supersaturated solution is developed in the crystallizer by cooling whereby $K_2SO_4$ crystallizes out. Alternatively, the solid starting materials may be dissolved in the solvent to form a supersaturated solution which is then introduced into the crystallizer wherein $K_2SO_4$ crystallizes out. A slurry is formed in the crystallization chamber which has a slurry density over 40% and up to about 80%. A portion of the liquor remaining after crystallization, herein referred to as supernatant collects at overflow means 7. A portion of the supernatant is generally removed via Line 6. A suspension with low to high salt content is continuously removed via outlet Line 2 located at the bottom portion of the crystallizer. Removal is effected using slurry pump 3. The slurry is fed into the middle portion of classifier section 4 which is a straight vertically disposed elongated tubular vessel in which a slurry density of 15% to 25% is maintained. It is in classifier section 4 that classification is carried out upstream and removed from the crystallizer. Coarse salt sinks into a lower conical part 11 of the classifier and is removed continuously. The salt solution containing the fine grains flows up out of the classifier and is returned to the crystallizer via Line 9. Supernatant used for fluidization is introduced from overflow means 7 of the crystallizer 1 via line 8 and liquid pump 5 through the lower conical part 11 and up through the elongated cylindrical vessel 4.

In accordance with one embodiment of this invention water and a $K_2SO_4$ precursor; that is, a mixture of salts which will form $K_2SO_4$ in solution comprising a sulfate such as $MgSO_4 \cdot 7H_2O$ and/or $K_2SO_4 \cdot MgSO_4 \cdot 4H_2O$ and/or $K_2SO_4 \cdot MgSO_4 \cdot 6H_2O$, or a solution of KCl, water and said sulfates is introduced into crystallizer 1. Within the crystallizer the KCl and the sulfates dissolve and reaction thereof is effected at a substantially constant temperature to form $K_2SO_4$ and sulfate liquor.

Classifier section 4, is a vertically disposed tubular member, preferably a cylinder of a length of from about 0.8 meters to about 2.0 meters. In the elongated cylindrical form, the ratio of diameter to length is from about 1:10 to about 1:15. By utilizing a classifier of the foregoing dimension, the stability of fluidization is maintained. Preferably a lower conical section 11 is located below classifier section 4 wherein the coarse $K_2SO_4$ accumulates.

In accordance with this invention at a slurry density of 45% $K_2SO_4$, utilizing a feed of $K_2SO_4 \cdot MgSO_4 \cdot 4H_2O$ or $K_2SO_4 \cdot MgSO_4 \cdot 6H_2O$, KCl and water, $K_2SO_4$ having an average grain diameter of 0.35mm at a uniformity coefficient of 2.4 is produced.

Moreover, the rate of fluidization may be adjusted to provide $K_2SO_4$ above about 0.3 to about 0.5mm in average grain diameter.

EXAMPLE

One cubic meter of sulfate solution containing 195 g/l KCl, 87 g/l $MgCl_2$, 65 g/l $MgSO_4$, 17 g/l NaCl and 870 g/l $H_2O$ at a temperature of 35° C. is placed into a crystallizer having internal circulation.

Sixty kg/h KCl, 90 kg/h $K_2SO_4$ $MgSO_4$ $4H_2O$ (leonite) and 150 kg/h $H_2O$ are fed into the crystallizer continuously. As a result of the dissolution and reaction of the solid substances, a solution supersaturated with $K_2SO_4$ is formed. Potassium sulfate crystallizes out from the sulfate solution.

Slurry density in the crystallization chamber is maintained at 60%.

From the lower outlet of the crystallizer, a salt slurry having a slurry density of 60% is continuously removed by a slurry pump and is introduced into a separate elongated cylindrical vessel 0.6 meters above the lower conical part of the classifier. The place of introduction of slurry into the classifier is located 0.5m below the lower part of the crystallizer. The elongated cylindrical classifier section has a diameter of 100 millimeters and a length of 1.2 meters.

Upstream classification takes place in the elongated cylindrical vessel of the classifier whereby coarse $K_4SO_4$ of a size above 0.16mm sinks into the lower conical part of the classifier and is continuously drawn off. The salt solution with the portion of fine grains below 0.16mm entrained therein flows upward and is returned to the crystallizer. The supernatant sulfate solution used for fluidization is fed from the overflow of the crystallizer by a liquid pump into the lower, conical part of the classifier. Supernatant sulfate also is withdrawn from the overflow means of the crystallizer and separately recovered.

The mean grain diameter for the returned fine grain is 0.11mm and the uniformity coefficient is 2.6 (Rosin-Rammler).

For the drawn off coarse crystallizate, the means grain diameter is 0.34mm and the uniformity coefficient is 3.3.

At the start-up of the process, a slurry density of about 50% is set with $K_2SO_4$.

The process of the invention offers the advantage, that independently of the value of the slurry density in the crystallizer and of the type of the circulating means in the crystallizer, upstream classification may be carried out with great selectivity. The process of the invention thus permits one to carry out upstream classification within a wide range of slurry density continuously and without interruption to thereby produce coarse crystallizate.

What is claimed is:

1. A continuous process for producing $K_2SO_4$ which comprises:
   (a) introducing $K_2SO_4$ or $K_2SO_4$ precursor and a solvent therefor into a crystallizer having a slurry outlet means at the bottom portion thereof, an overflow means for supernatant liquid at the top portion thereof and circulating means therein;
   (b) supersaturating the resultant solution of $K_2SO_4$ in said crystallizer, and crystallizing $K_2SO_4$ out of the resultant supersaturated solution of $K_2SO_4$ to form a slurry comprising coarse and fine crystalline $K_2SO_4$ and supernatant, said slurry having a slurry density of over 40% and up to about 80% by weight;
   (c) withdrawing slurry from the bottom portion of said crystallizer and introducing said slurry into a separate elutriation classifier comprising an elongated tubular vessel;
   (d) withdrawing supernatant collecting at the overflow means of the crystallizer and introducing supernatant into the lower portion of said elongated tubular vessel;
   (e) maintaining a slurry density of from about 15% to about 25% by weight, and a flow rate sufficient to effect elutriative separation of particles of a size below 0.16 mm from coarser particles, within said elongated tubular vessel;
   (f) withdrawing the supernatant and fine crystalline $K_2SO_4$ passing upwardly in the elongated tubular vessel, as overhead from the elongated tubular vessel and recycling same to the crystallizer; and,
   (g) withdrawing coarse crystalline $K_2SO_4$ of a particle size above 0.16 mm at the lower portion of said elongated tubular vessel.

2. The process of claim 1 further characterized in that a portion of the supernatant collected at the overflow means is withdrawn from the overflow means and recovered.

3. The process of claim 1 further characterized in that the $K_2SO_4$ or $K_2SO_4$ precursor and solvent are introduced into the crystallizer in the form of solution.

4. The process of claim 1 further characterized in that a salt selected from the group consisting of $MgSO_4 \cdot 7H_2O$, $K_2SO_4 \cdot MgSO_4 \cdot 4H_2O$, and $K_2SO_4 \cdot MgSO_4 \cdot 6H_2O$, water and KCl are introduced into the crystallizer to form a mother liquor containing $K_2SO_4$, said mother liquor formation being effected at about a constant temperature.

5. The process of claim 1 further characterized in that the elongated tubular vessel is a cylindrical vessel having a length of from about 0.8 meters to about 2 meters.

6. The process of claim 5, further characterized in that the elongated cylindrical vessel is of a size such that ratio of diameter to length of said vessel is from about 1:10 to about 1:15.

7. The process of claim 1 wherein the rate of flow of the fluid passing upwardly within the elongated cylinder is adjusted to collect $K_2SO_4$ having an average grain size above about 0.3 mm to about 0.5 mm as the classifier product withdrawn in step (g).

8. The process of claim 7 further characterized in that the crystallizer is operated at a slurry density of 45% $K_2SO_4$, utilizing a feed of KCl, water and a sulfate salt selected from the group consisting of $MgSO_4 \cdot 7H_2O$, $K_2SO_4 \cdot MgSO_4 \cdot 4H_2O$ and $K_2SO_4 \cdot MgSO_4 \cdot 6H_2O$, to form $K_2SO_4$ having an average grain diameter of about 0.35 mm at a uniformity coefficient of 2.4 as the classifier product withdrawn in step (g).

* * * * *